(12) United States Patent
Ma et al.

(10) Patent No.: US 12,402,074 B2
(45) Date of Patent: Aug. 26, 2025

(54) POWER SAVING TECHNIQUES

(71) Applicant: ZTE Corporation, Guangdong (CN)

(72) Inventors: Xiaoying Ma, Guangdong (CN);
Mengzhu Chen, Guangdong (CN);
Qiujin Guo, Guangdong (CN); Jun Xu,
Guangdong (CN); Xuan Ma,
Guangdong (CN); Qiang Fu,
Guangdong (CN)

(73) Assignee: ZTE Corporation, Shenzhen (CN)

( * ) Notice: Subject to any disclaimer, the term of this patent is extended or adjusted under 35 U.S.C. 154(b) by 534 days.

(21) Appl. No.: 17/853,533

(22) Filed: Jun. 29, 2022

(65) Prior Publication Data

US 2022/0338120 A1  Oct. 20, 2022

Related U.S. Application Data

(63) Continuation of application No. PCT/CN2020/107888, filed on Aug. 7, 2020.

(51) Int. Cl.
*H04W 52/02* (2009.01)
*H04W 72/0446* (2023.01)
*H04W 72/23* (2023.01)

(52) U.S. Cl.
CPC ... *H04W 52/0229* (2013.01); *H04W 52/0274* (2013.01); *H04W 72/0446* (2013.01); *H04W 72/23* (2023.01)

(58) Field of Classification Search
CPC ......... H04W 52/0229; H04W 52/0274; H04W 72/0446; H04L 5/0053
See application file for complete search history.

(56) References Cited

U.S. PATENT DOCUMENTS

| 2013/0194956 | A1 | 8/2013 | Sartori et al. |
| 2020/0221431 | A1 | 7/2020 | Hosseini et al. |
| 2021/0136771 | A1* | 5/2021 | Xu ..................... H04W 72/0453 |
| 2021/0168835 | A1* | 6/2021 | Xiao ..................... H04L 5/0044 |
| 2021/0195521 | A1* | 6/2021 | Müller ................. H04W 76/28 |

FOREIGN PATENT DOCUMENTS

| WO | 2020102146 A2 | 5/2020 |
| WO | 2020145748 A1 | 7/2020 |
| WO | 2020145750 A1 | 7/2020 |

(Continued)

OTHER PUBLICATIONS

Samsung, "DL signals and channels for NR-U," 3GPP TSG RAN WG1 #100-e, e-Meeting, R1-2000608, 5 pages, Feb. 24-Mar. 6, 2020.

(Continued)

*Primary Examiner* — Khalid W Shaheed
(74) *Attorney, Agent, or Firm* — Perkins Coie LLP

(57) ABSTRACT

Techniques are described to enable a user equipment (UE) to save power consumption during monitoring of a control channel. An example technique includes determining, by a communication device, a monitoring mode for the control channel based on at least one of a reception of a first predefined signaling and a first timer, wherein the first predefined signaling includes a search space set group switch indication. The technique further includes monitoring the control channel based on the monitoring mode after an apply duration.

17 Claims, 8 Drawing Sheets

(56) References Cited

FOREIGN PATENT DOCUMENTS

WO     WO-2021154420 A1 * 8/2021 ........... H04L 5/0051

OTHER PUBLICATIONS

Motorola Mobility, "Email discussion on search space set monitoring/switching (NR-U DL)," 3GPP TSG RAN WG1 #100e, R1-2001389, Mar. 6, 2020.
International Search Report and Written Opinion for International Application No. PCT/CN2020/107888, mailed on Apr. 26, 2021 (6 pages).
Ericsson, "UE power saving using search space set switching," 3GPP TSG RAN WG1 #101-e, Tdoc R1-2004360, e-Meeting, May 25-Jun. 5, 2020 (6 pages).
Motorola Mobility et al., "Feature Lead Summary: Email discussion [100e-NR-unlic-NRU-DL_Signals_and_Channels-03] on search space set monitoring/switching," 3GPP TSG RAN WG1#100e, R1-2001342, Feb. 24-Mar. 6, 2020 (30 pages).
Office Action for Chinese Patent Application No. 2020801041623, mailed Sep. 23, 2024 (21 pages).
CNIPA, Second Office Action for Chinese Application No. 2020801041623, mailed on May 22, 2025, 19 pages with unofficial English translation.

* cited by examiner

POWER SAVING TECHNIQUES

CROSS REFERENCE TO RELATED APPLICATIONS

This patent document is a continuation of and claims benefit of priority to International Patent Application No. PCT/CN2020/107888, filed on Aug. 7, 2020. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

The techniques disclosed in this patent document can enable a communication device or a user equipment (UE) or a wireless access node to save power consumption. In some embodiments, the wireless access node communicates with a mobile station. In some embodiments, the communication device determines a monitoring mode for the control channel based on at least one of a reception of a first predefined signaling and a first timer, wherein the first predefined signaling includes a search space set group switch indication. In such embodiments, the communication device monitors the control channel based on the monitoring mode after an apply duration.

In some embodiments, the mobile station, determines a monitoring mode associated with a first PDCCH search space set group index. In such embodiments, the mobile station transmits to the wireless access node the first predefined signaling that includes a search space set group switch indication and the first PDCCH search space set group index.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a wireless access device that is configured or operable to perform the above-described methods is disclosed.

In yet another exemplary embodiment, a network device that is configured or operable to perform the above-described methods is disclosed.

The above and other aspects and their implementations are described in greater detail in the drawings, the descriptions, and the claims.

The example headings for the various sections below are used to facilitate the understanding of the disclosed subject matter and do not limit the scope of the claimed subject matter in any way. Accordingly, one or more features of one section can be combined with one or more features of another section. Furthermore, 5G terminology is used for the sake of clarity of explanation, but the techniques disclosed in the present document are not limited to 5G technology only, and may be used in wireless systems that implemented other protocols.

DETAILED DESCRIPTION

With the development of wireless communication technologies, performance factors such as transmission rate, delay, throughput, and reliability of wireless communication systems have been greatly improved through technologies such as high frequency band, large bandwidth, and multiple antennas. On the other hand, in order to achieve high-performance wireless transmission, the user equipment (UE) is expected to perform relatively complex processing to meet performance requirements, for example, detecting a large control channel bandwidth, more complicated control information, data information encoding, decoding processing, etc., and the power consumption of the UE can affect the user experience. Therefore, the power saving of the UE is a problem that the wireless communication system should solve. In the development of wireless communication technology, how to save UE power consumption and achieve the balance of system performance and UE power under the premise of meeting certain performance indicators is a problem to be solved.

Figure 1:
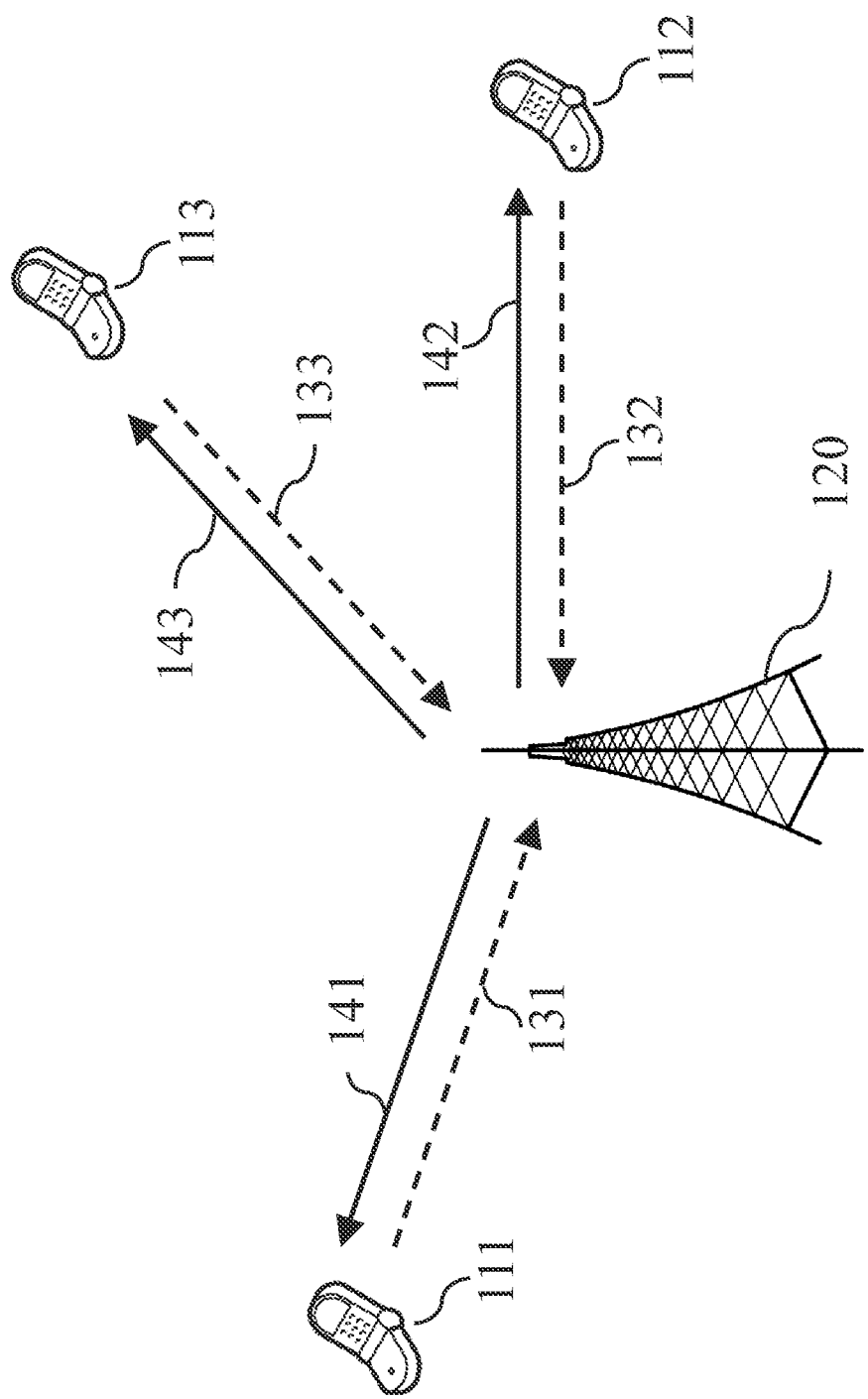
FIG. 1 shows an example of a base station (BS) and user equipment (UE) in wireless communication.

FIG. 1 shows an example of a wireless communication system (e.g., a long term evolution (LTE), 5G or NR cellular network) that includes a BS 120 and one or more user equipment (UE/communication device/wireless access node) 111, 112 and 113. In some embodiments, the uplink transmissions (131, 132, 133) include uplink control information (UCI), higher layer signaling (e.g., UE assistance information or UE capability), or uplink information. In some embodiments, the downlink transmissions (141, 142, 143) include DCI or high layer signaling or downlink information. The UE may be, for example, a smartphone, a tablet, a mobile computer, a machine to machine (M2M) device, a terminal, a mobile device, an Internet of Things (IoT) device, and so on.

The present document uses section headings and sub-headings for facilitating easy understanding and not for limiting the scope of the disclosed techniques and embodiments to certain sections. Accordingly, embodiments disclosed in different sections can be used with each other. Furthermore, the present document uses examples from the 3GPP NR network architecture and 5G protocol only to facilitate understanding and the disclosed techniques and embodiments may be practiced in other wireless systems that use different communication protocols than the 3GPP protocols.

Brief Discussion

In LTE communication systems, discontinuous reception (DRX) can be used for terminal (or UE) power saving.

Figure 2:
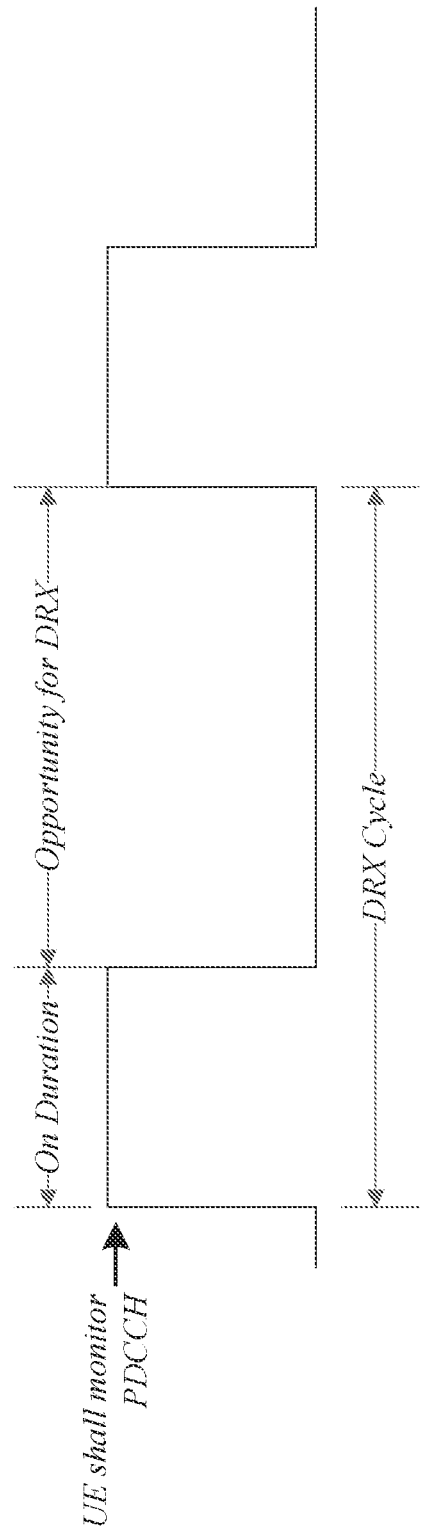
FIG. 2 illustrates a Discontinuous Reception (DRX) cycle.

FIG. 2 illustrates an example of a DRX cycle. The basic mechanism of DRX is to configure the DRX cycle for UE. A drx-ondurationTimer begins a DRX cycle. During the drx-ondurationTimer, the UE is in a 'DRX On' state and continues monitoring a physical downlink control channel (PDCCH), and, if UE successfully decodes a PDCCH, the UE stays awake (in 'DRX On' state) and starts the inactivity timer. The UE can go to sleep (in 'DRX off' state) after the drx-ondurationTimer or drx-inactivityTimer expires. In 'DRX off', the UE does not monitor PDCCH to save power.

Active Time Description

When a DRX cycle is configured, the Active Time for Serving Cells in a DRX group includes the time while:
  drx-onDurationTimer or drx-InactivityTimer configured for the DRX group is running; or
  drx-RetransmissionTimerDL or drx-RetransmissionTimerUL is running on any Serving Cell in the DRX group; or
  ra-ContentionResolutionTimer or msgB-ResponseWindow is running; or
  a Scheduling Request is sent on PUCCH and is pending; or
  a PDCCH indicating a new transmission addressed to the cell radio network temporary identifier (C-RNTI) of the medium access control (MAC) entity has not been received after successful reception of a Random Access Response for the Random Access Preamble not selected by the MAC entity among the contention-based Random Access Preamble.

'DRX On' includes a time when the drx-onDurationTimer or drx-InactivityTimer starts.

In NR, more power saving techniques are proposed. For example, a DCI format 2_6 can be used for notifying the power saving information outside of the DRX Active Time for one or more UEs. In another example, a field in DCI format 0_1 and 1_1 can be used to indicate minimum applicable scheduling offset (cross slot scheduling), etc. In another example, DCI format 0_1 or 1_1 or 2_6 can used to indicate a SCell dormancy, etc.

In 5G NR-U(unlicensed), more power saving techniques using the search space set group switching functionality are proposed. In some examples, the search space set group switching can be triggered by the DCI format 2-0. In some examples, the timer can be configured with the value configured by the high layer parameter searchSpaceSwitching-Timer-r16. In some examples, the UE can be provided a group index for a respective search space set by searchSpaceGroupIdList-r16 for PDCCH monitoring on a serving cell. If the UE is provided searchSpaceSwitching-GroupList-r16, indicating one or more groups of serving cells, the search space set group switching procedures may apply to all serving cells within each group. If the UE is not provided searchSpaceSwitchingGroupList-r16, the search space set group switching procedures may apply only to a serving cell for which the UE is provided searchSpaceGroupIdList-r16.

Cross Slot Scheduling:

In New Radio(NR) release-16, high layer signaling minimumSchedulingOffsetK0 can configure one or two minimum K0(k0 min) value. In some examples, if the high layer signaling is configured, a minimum applicable scheduling offset indicator field in Downlink control information (DCI) format 1_1 bitwidth can be 1 bit. In some examples, if the high layer signaling is not configured, a minimum applicable scheduling offset indicator field in Downlink control information (DCI) format 1_1 bitwidth can be 0 bit.

In some examples, the high layer signaling minimumSchedulingOffsetK2 can configure one or two minimum K2 (k2 min) value. In some examples, if the high layer signaling is configured, a minimum applicable scheduling offset indicator field in DCI format 0_1 bitwidth can be 1 bit. In some examples, if the high layer signaling is not configured, a minimum applicable scheduling offset indicator field in DCI format 0_1 bitwidth can be 0 bit. In some embodiments, the field in DCI format 0_1 or DCI format 1_1 is used to determine (or indicate) a minimum K0 or a minimum K2. In some embodiments, if K0min is greater than 0, a DCI and a physical downlink shared channel (PDSCH) which is scheduled by the DCI cannot be received in one slot. In such embodiments, the user equipment (UE) can relax processing time to save power. In some embodiments, if K2 min is greater than 0, a scheduled physical uplink shared channel (PUSCH) scheduled by a DCI and the DCI may not be received in one slot.

In some embodiments, K0min is defined as minimum Slot offset between DCI and its scheduled PDSCH (physical downlink shared channel).

In some embodiments, K2 min is defined as minimum Slot offset between DCI and its scheduled PUSCH(physical uplink shared channel).

In some embodiments, K0 is defined as Slot offset between DCI and its scheduled PDSCH (physical downlink shared channel).

In some embodiments, K2 is defined as Slot offset between DCI and its scheduled PUSCH (physical uplink shared channel).

Physical downlink control channel (PDCCH) search space set configuration:

In some embodiments, for each DL BWP configured to a UE in a serving cell, the UE can be provided with higher layers with S≤10 search space sets where, for each search space set from the S search space sets, the UE can be provided with the following by SearchSpace:
  a search space set index s, 0<s<40, by searchSpaceId,
  a PDCCH monitoring periodicity of k_s slots and a PDCCH monitoring offset of o_s slots, by monitoringSlotPeriodicityAndOffset,
  a PDCCH monitoring pattern within a slot, indicating first symbol(s) of the CORESET within a slot for PDCCH monitoring, by monitoringSymbolsWithinSlot,
  a duration of T_s<k_s slots indicating a number of slots that the search space set s exists by duration.

Figure 3:
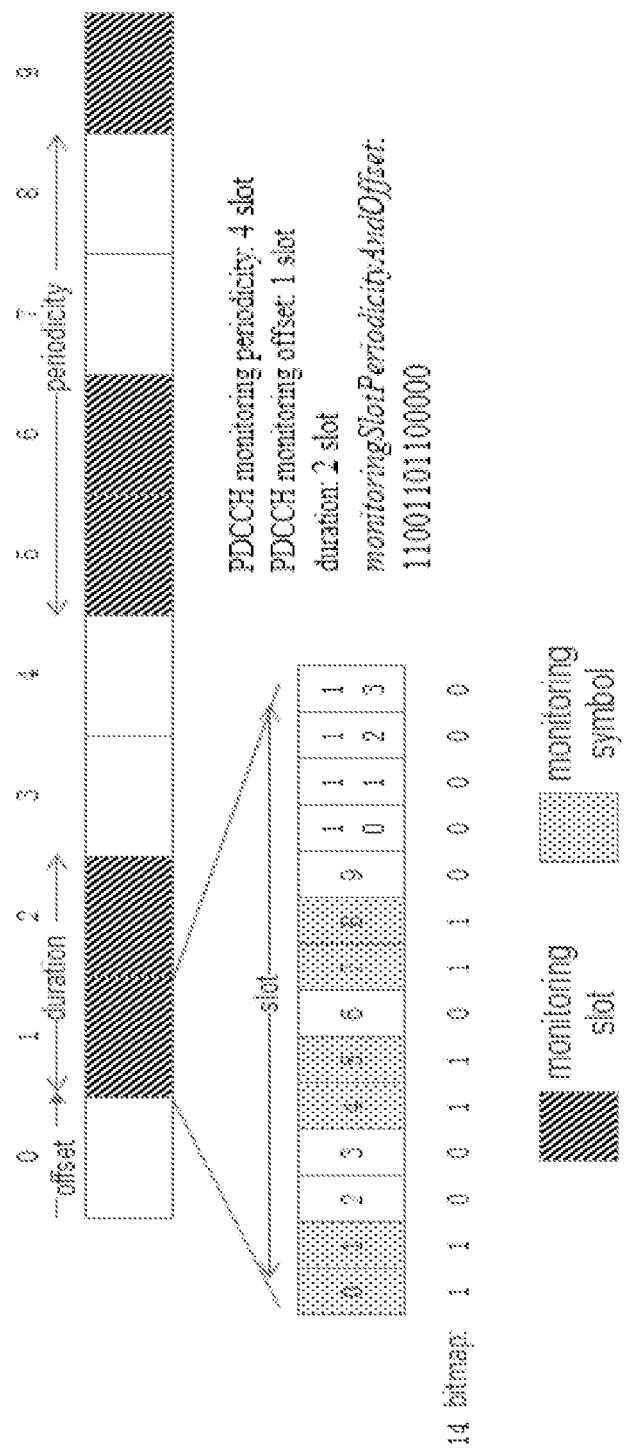
FIG. 3 illustrates how UE monitors PDCCH.

FIG. 3 illustrates how UE monitors PDCCH. UE monitors the control channel based on a monitoring mode. In some embodiments, the monitoring mode consists of one or more parameters that enable a UE to monitor the control channel based on such one or more parameters. In some embodiments, the monitoring mode can be associated with (or determined by) a group of search space set where UE monitors PDCCH. In some embodiments, search space sets are divided into different search space set groups. In some embodiments, UE monitors PDCCH according to the monitoring mode associated with a search space set group. In some embodiments, the number of slots where UE may need to monitor PDDCH based on a specific search space set group may be less than the number of slots where UE may need to monitor PDDCH based on a different search space set group, thereby saving power.

In some embodiments, a group of search space set where UE monitors PDCCH represent a monitoring mode. In some examples, UE determines how to monitor PDCCH according to the parameters: monitoringSlotPeriodicityAndOffset, monitoringSymbolsWithinSlot and duration in every SearchSpace configuration. In conventional systems, UE consumes large power in monitoring PDCCH. However, if a search space set is configured with larger PDCCH monitoring periodicity or with smaller PDCCH monitoring duration, the number of slots where UE may need to monitor PDDCH may be reduced and this helps in saving power. In some embodiments, if number of symbols in one slot is reduced, it also helps in reducing power consumption.

In some embodiments, if UE (User equipment) is in an Active Time (e.g., DRX On), UE may monitor PDCCH (Physical downlink control channel) during every monitoring occasion configured by high layer signaling. However, if gNodeB does not send any DCI (Downlink control information) via PDCCH, UE can spend enormous power on monitoring PDCCH. In some embodiments, PDCCH search space set group switch can be utilized as a method to let UE reduce number of PDCCH monitoring during a period time even in Active Time to save power. In this invention, UE can be indicated a PDCCH search space set group switch indication by a triggering method to save power.

Brief Description

In some embodiments, the UE may receive a predefined signaling from gNodeB (gNB). In some embodiments, the UE determines the search space set group according to at least one of the predefined signaling and a high layer signaling. In some embodiments, the UE monitors PDCCH according to search space set group. In some embodiments, predefined signaling is a DCI. In some embodiments, a field in predefined signaling is used to indicate at least one of the following: minimum applicable scheduling offset indication, a search space set group switch indication, a secondary Cell(SCell) dormancy indication. In some embodiments, the field used to indicate search space set group switch indication is at least one of the following: minimum applicable scheduling offset indication field, a search space set group switch indication field, a secondary Cell(SCell) dormancy indication field, modulation and coding scheme field, new data indicator field, redundancy version field, HARQ process number field, antenna port(s) field, and DMRS sequence initialization field.

Figure 4:
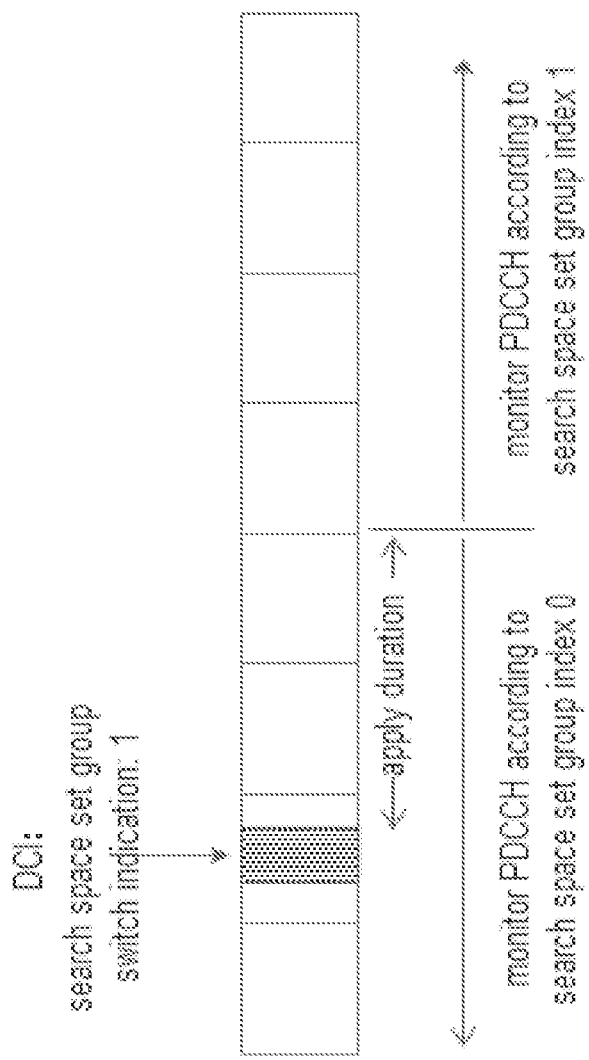
FIG. 4 illustrates how UE switches monitoring mode based on search space set group switch indication.

FIG. 4 illustrates how UE switches monitoring mode based on search space set group switch indication. In some embodiments, UE may determine a monitoring mode for the control channel based on at least one of a reception of a first predefined signaling and a first timer, wherein the first predefined signaling includes a search space set group switch indication. In such embodiments, the UE monitors the control channel based on the monitoring mode after an apply duration. In some embodiments, the UE determines the monitoring mode based on one or more information fields in the first predefined signaling. In some embodiments, High layer signaling may include search space set group configuration information.

For example, in some embodiments, if UE receives a DCI signal containing a search space set group switch indication and the search space set group switch indication indicates a new search space set group index which is different from the current search space set group index, UE may switch the monitoring mode to a new monitoring mode indicated by the new search space set group index and monitor PDCCH according to the new monitoring mode indicated by the DCI after an apply duration. As shown in FIG. 4, in some embodiments, UE may receive a DCI signal indicating a search space set group switch indication and search space set group index with value '1' (in this embodiment, value '0' means search space set group index 0, and value '1' means search space set group index 1). In this embodiment, UE may stop monitoring PDCCH according to search space set group index 0 and may start monitoring PDCCH according to search space set group index 1 after an apply duration.

Search Space Set Group Configuration

In some embodiments, search space set group is configured based on a high layer signaling. In some embodiments, high layer signaling includes at least one of following: a Layer 3 signaling (e.g., radio resource control signal) or a Layer 2 signaling (e.g., medium access control (MAC) control element signal). For example, in some embodiments, search space set group may be configured based on a radio resource control (RRC) signaling. In some embodiments, multiple search space sets with same search space set group index are in same search space set group. In some embodiments, if a search space set is not configured with a search space set group index, the search space set group index may be a default value (e.g., 0), wherein the default value is an integer greater than or equal to 0 and less than 10. In some embodiments, a search space set can be configured with multiple search space set group index. For example, a search space set can be configured with search space set group index 0 and a search space set group index 1, that is, the search space set can belong to both search space set group 1 and search space set group 0.

In some embodiments, search space set group is configured based on a high layer signaling. The high layer signaling include at least one of the following: PDCCH monitoring periodicity, PDCCH monitoring offset, duration, PDCCH monitoring pattern within a slot and a search space index. search space sets are grouped by at least one of the following: PDCCH monitoring periodicity, PDCCH monitoring offset, duration, PDCCH monitoring pattern within a slot and a search space index. The benefit of this method is that gNB may not need to send additional signaling. For example, search space sets configured with PDCCH monitoring periodicity greater than first threshold may be in a same search space set group and search space sets configured with PDCCH monitoring periodicity not greater than first threshold may be in another search space set group.

For another example, search space sets configured with duration greater than second threshold may be in a same search space set group and search space sets configured with duration not greater than second threshold may be in another search space set group.

For another example, search space sets configured with duration greater than second threshold and PDCCH monitoring periodicity less than a first threshold may be in a same search space set group, and search space set configured with duration not greater than second threshold or PDCCH monitoring periodicity greater than or equal to a first threshold may be in another search space set group. In some embodiments, the first threshold is a positive integer, such as, 100. In some embodiments, the second threshold is a positive integer, such as, 20.

In some embodiments, a search space set may support search space set group switch and can be referred to as being first kind of search space set. For example, the search space set can be configured only in one search space set group. In such embodiments, the first kind of search space set includes at least one of: UE-specific search space(USS), Type 3 Common search space(CSS).

In other embodiments, a search space set may not support search space set group switch and can be referred to as being second kind of search space set. For example, the search space set can be configured in every search space set group thereby not supporting search space set group switch. In such embodiments, the second kind of search space set includes at least one of: Type 1 CSS, Type 0 CSS, Type OA CSS, Type 2 CSS.

Triggering Method

In some embodiments, the monitoring mode for the control channel is based on a reception of a first predefined signaling. In other embodiments, the monitoring mode for the control channel is based on a first timer.

In other words, PDCCH search space set group switch may be triggered by at least one of the following: a predefined signaling, a timer, and a predefined condition. In some embodiments, PDCCH search space set group switch may be triggered by a predefined signaling. In some embodiments, predefined signaling indicates at least one of: search space set group index, enable or disable a search space set group, a search space set switch parameter. In some embodiments, a search space set switch parameter includes at least one of the following: a scaling factor of PDCCH monitoring periodicity, a threshold of PDCCH monitoring periodicity, a threshold of monitoring duration, a scaling factor of duration, a PDCCH monitoring periodicity, a duration. The benefit of predefined signaling indicates a search space set switch parameter is that the search space sets can be grouped into two groups dynamically according to the search space set switch parameter.

In some embodiments, a search space set switch parameter includes a PDCCH monitoring periodicity. In such embodiments, the PDCCH monitoring periodicity of a first kind search space set reset to the indicated PDCCH monitoring periodicity. In some embodiments, the first kind search space set include USS or Type3 CSS.

In some embodiments, a search space set switch parameter includes a duration. In such embodiments, the PDCCH monitoring duration of a first kind search space set reset to the indicated PDCCH monitoring duration. In some embodiments, the first kind search space set include USS or Type3 CSS.

In some embodiments, a search space set switch parameter includes a threshold of PDCCH monitoring periodicity. In such embodiments, the UE monitors PDCCH according to the search space set which configured with a PDCCH monitoring periodicity greater than or equal to the threshold. In some embodiments, a search space set switch parameter includes a threshold of PDCCH monitoring periodicity. In such embodiments, if a search space set is configured with a PDCCH monitoring periodicity less than the threshold, UE may monitor PDCCH in the search space set according to function {PDCCH monitoring periodicity, threshold}. In some embodiments, this function may be maximum function. In other embodiments, this function may be the least common multiple function. In some embodiments, this function may be the addition function.

In some embodiments, a search space set switch parameter includes a threshold of monitoring duration. In such embodiments, the UE monitors PDCCH according to the search space set which may be configured with a PDCCH monitoring duration less than the threshold.

In some embodiments, a search space set switch parameter may be a scaling factor of PDCCH monitoring periodicity. In such embodiments, if UE receives a scaling factor of PDCCH monitoring periodicity, the PDCCH monitoring periodicity of the search space set in a search space set group may be multiplied by the scaling factor. In some embodiments, the search space set group is USS and Type-3 CSS in the active BWP of the serving cell which receive the indication.

In some embodiments, the search space set group is search space set in the active BWP which receives the indication. In some embodiments, the search space set group is USS and Type-3 CSS in the active BWP. In some embodiments, the search space set group is search space set in an active BWP.

In some embodiments, PDCCH search space set group switch may be triggered by at least a timer. In such embodiments, the timer value may be configured by a high layer signaling. In such embodiments, if the high layer signaling is configured, PDCCH search space set group switch triggered by timer may be enabled. In some embodiments, if a high layer signaling configured more than one search space set group and current applied search space set group index is first kind, UE may change to another search space set group at least after an apply duration or after timer expires. In some embodiments, the UE may decrement the timer value by one after each slot for a reference SCS configuration μ. In some embodiments, if the PDCCH search space set group switch is triggered based on the reception of the predefined signaling, the apply duration is a first apply duration, and if the PDCCH search space set group switch is triggered based on the timer, the apply duration is a second apply duration, wherein the second apply duration is different from the first apply duration.

In some embodiments, a first kind search space set group is a search space set group with larger periodicity or smaller duration or lower index.

In some embodiments, PDCCH search space set group switch may be triggered by at least a predefined signaling. For example, in some embodiments, if the DCI-based PDCCH search space set switch indication is enabled and UE may not receive a predefined signaling indicating which group is applied, a default search space set group will be used. In some embodiments, the default search space set group may be configured by high layer signaling. In some embodiments, the default search space set may be a search space set group with smaller periodicity or larger duration or lower index. In some embodiments, the default search space set group may be a search space set group with larger periodicity or smaller duration.

Enable DCI Based PDCCH Search Space Set Group Switch.

In some embodiments, PDCCH search space set group switch triggered by a DCI is enabled. In other words, in such embodiments, DCI can be used to indicate a PDCCH search space set group switch. In some embodiments, PDCCH search space set group switch triggered by a DCI is not enabled. In such embodiments, DCI cannot indicate a PDCCH search space set group switch.

In some embodiments, indicating a search space set group switch means indicating a search space set group index. In some embodiments, indicating a search space set group switch means indicating a search space set group index different from current applied search space set group index. In some embodiments, DCI based PDCCH search space set group switch may be enabled based on at least one of the following: a high layer signaling, a UE capability, a DCI, a Radio Network Temporary Identifier (RNTI), a bandwidth part(BWP), a band. DCI based PDCCH search space set group switch is PDCCH search space set group switch triggered by a DCI. In some embodiments, DCI based PDCCH search space set group switch may be enabled based at least a high layer signaling.

For example, a high layer signaling is used to enable DCI based PDCCH search space set group switch. In such embodiments, if the high layer signaling is configured, DCI based PDCCH search space set group switch is enabled, otherwise, DCI based PDCCH search space set group switch is disabled. In another example, a high layer signaling is used to indicate enabling or disabling of DCI based PDCCH search space set group switch. In such examples, if the high layer signaling is configured and indicates enable DCI based PDCCH search space set group switch, the DCI based search space set group switch is enabled, otherwise, the DCI based search space set group is disabled.

In yet another example, a high layer signaling is used to enable DCI based PDCCH search space set group switch. In such examples, if search space configured in a BWP include more than third threshold values of search space set group index, DCI based PDCCH search space set group switch is enabled, otherwise, DCI based PDCCH search space set group switch is disabled. In such embodiments, the third threshold is a positive integer and less than 6 (e.g., 1). In some embodiments, DCI based PDCCH search space set group switch may be enabled based on at least a UE capability. For example, UE capability may be a UE report whether UE supports DCI based PDCCH search space set switch. In such examples, if UE report indicates support, DCI based PDCCH search space set group switch is enabled, otherwise, DCI based PDCCH search space set group switch is disabled.

In some embodiments, DCI based PDCCH search space set group switch may be enabled based on at least a DCI and a high layer signaling. For example, if a DCI includes a minimum applicable scheduling offset field with bitwidth greater than or equal to 1 bit and a high layer signaling configured with at least two groups of search space set group, the DCI-based PDCCH search space set group switch is enabled.

In some embodiments, DCI based PDCCH search space set group switch may be enabled based on at least a DCI. For example, in such examples, if the DCI format is first kind DCI format, DCI based PDCCH search space set group switch is enabled, otherwise, DCI based PDCCH search space set group switch is disabled. In some embodiments, the first kind DCI format may include at least one of the following: DCI format 0_1, DCI format 1_1, DCI format 0_2, DCI format 1_2, DCI format 2_0, DCI format 2_6. In such embodiments, the DCI format may include a field for PDCCH search space set group switch indication.

In some embodiments, DCI based PDCCH search space set group switch may be enabled based on at least a RNTI. In such embodiments, if the DCI is scrambled with a first kind RNTI, DCI based PDCCH search space set group switch is enabled, otherwise, DCI based PDCCH search space set group switch is disabled. In such embodiments, the first kind RNTI may include at least one of the following: cell radio network temporary identifier (C-RNTI), configured scheduling RNTI (CS-RNTI), modulation coding scheme C-RNTI (MCS-C-RNTI), slot format indication RNTI (SFI-RNTI), semi-persistent channel state information RNTI (SP-CSI-RNTI), Power saving RNTI(PS-RNTI), a specific RNTI. In some embodiments, a specific RNTI is a RNTI used for search space set group switch or to reduce PDCCH monitoring.

In some embodiments, DCI based PDCCH search space set group switch may be enabled based on at least a RNTI and a high layer signaling. In such embodiments, if the DCI is scrambled with a first kind RNTI and a high layer signaling enables DCI based PDCCH search space set group switch, DCI based PDCCH search space set group switch is enabled, otherwise, DCI based PDCCH search space set group switch is disabled.

In some embodiments, DCI based PDCCH search space set group switch may be enabled based on at least a DCI and a high layer signaling. In such embodiments, if the DCI format is a first kind DCI format and high layer signaling enables DCI based PDCCH search space set group switch, DCI based PDCCH search space set group switch is enabled, otherwise, DCI based PDCCH search space set group switch is disabled. In such embodiments, the first kind DCI format may include at least one of the following: DCI format 0_1, DCI format 1_1, DCI format 0_2, DCI format 1_2, DCI format 2_0, DCI format 2_6. In such embodiments, the DCI format includes a field for PDCCH search space set group switch indication.

In some embodiments, DCI based PDCCH search space set group switch may be enabled based on at least a DCI and a RNTI. In such embodiments, if the DCI format is a first kind DCI format and scrambled with a first kind RNTI, DCI based PDCCH search space set group switch is enabled, otherwise, DCI based PDCCH search space set group switch is disabled.

In some embodiments, DCI based PDCCH search space set group switch may be enabled based on at least a BWP. In such embodiments, if search space configured in a BWP include more than third threshold values of search space set group index, DCI based PDCCH search space set group switch is enabled, otherwise, DCI based PDCCH search space set group switch is disabled. In such embodiments, the third threshold is an positive integer value and less than 6 (e.g., 1).

In some embodiments, DCI based PDCCH search space set group switch may be enabled based on at least a band. In some embodiments, DCI based PDCCH search space set group switch may be enabled in licensed band, and may be disabled in unlicensed band. In some embodiments, if DCI based PDCCH search space set group switch is enabled, a field may be used to indicate that PDCCH search space set switch is present in a DCI. In some embodiments, predefined signaling is a DCI.

Reuse or Repurpose Existing Field

In some embodiments, the field used to indicate PDCCH search space set switch may be a reused field in DCI. For example, DCI may include several information fields, each information field has its own purpose. Reusing a DCI field means repurposing the information field. For example, a minimum applicable scheduling offset indicator field is used to indicate a minimum scheduling offset restriction. In some embodiments, if minimum applicable scheduling offset indicator field is reused or repurpose to indicate a PDCCH search space set switch, this field may be used to indicate at least one of PDCCH search space set switch and minimum scheduling offset restriction.

In some embodiments, at least one of the following field may be reused (or repurposed) to indicate a PDCCH search space set switch: a minimum applicable scheduling offset indication field, a search space set group switch indication field, a secondary Cell (SCell) dormancy indication field, Modulation and coding scheme field, New data indicator field, Redundancy version field, HARQ process number field, Antenna port(s) field, and DMRS sequence initialization field.

In some embodiments, minimum scheduling offset restriction indicator field is reused or repurpose to indicate PDCCH search space set group switch, which means the field can be used to indicate a minimum scheduling offset restriction and a PDCH search space set group switch.

For example, in some embodiments, if DCI based PDCCH search space set group switch is enabled and minimum scheduling offset restriction indicator field is present, the minimum scheduling offset restriction indicator field is used to indicate a PDCCH search space set switch and a minimum scheduling offset restriction. In some embodiments, value '0' indicated by the field indicate a first kind search space set group and value '1' indicated by the field indicates a second kind search space set group. In some embodiments, the first kind search space set group is search space set group index 0, and the second kind search space set group is search space group index 1.

For another example, if DCI based PDCCH search space set group switch is disabled and minimum scheduling offset restriction indicator field is present, the minimum scheduling offset restriction indicator field is only used to indicate minimum scheduling offset restriction.

In another example, if DCI based PDCCH search space set group switch is enabled and minimum scheduling offset restriction is disabled (minimumSchedulingOffsetK0 or minimumSchedulingOffsetK2 is not configured). the minimum scheduling offset restriction indicator field is present and is used to only indicate a PDCCH search space set group switch.

In yet another example, if DCI based PDCCH search space set group switch is disabled and minimum scheduling offset restriction is disabled (minimumSchedulingOffsetK0 or minimumSchedulingOffsetK2 is not configured). the minimum scheduling offset restriction indicator field is not present. In some embodiments, the bit of the minimum scheduling offset restriction field is used to indicate PDCCH search space set group switch in the BWP or serving cell which received the indication. The benefits of this technique may include: minimum scheduling offset restriction field can be present at least in DCI format 0_1 or DCI format 1_1. using this field and there may not be a need to add a new field.

In some embodiments, fields that are used for SCell dormancy indicator are reused or repurposed to indicate PDCCH search space set group switch. The fields which can be used for SCell dormancy indication are called SCell dormancy indicator fields. The fields which can be used for SCell dormancy indication include at least one of the following: a secondary Cell (SCell) dormancy indication field, Modulation and coding scheme field, New data indicator field, Redundancy version field, HARQ process number field, Antenna port(s) field, and DMRS sequence initialization field.

SCell dormancy indication is used to indicate whether a SCell group switch to a dormancy BWP. The UE does not monitor PDCCH in dormancy BWP. SCell dormancy indication—0 bit if higher layer parameter Scell-groups-for-dormancy-within-active-time is not configured; otherwise 1, 2, 3, 4 or 5 bits bitmap determined according to higher layer parameter Scell-groups-for-dormancy-within-active-time, where each bit corresponds to one of the SCell group(s) configured by higher layers parameter Scell-groups-for-dormancy-within-active-time, with MSB to LSB of the bitmap corresponding to the first to last configured SCell group. The field is only present when this format is carried by PDCCH on the primary cell within DRX Active Time and the UE is configured with at least two DL BWPs for an SCell.

In some embodiments, if one-shot HARQ-ACK request is not present or set to '0', and all bits of frequency domain resource assignment are set to 0 for resource allocation type 0 or set to 1 for resource allocation type 1 or set to 0 or 1 for dynamic switch resource allocation type, this field is reserved and the following fields among the fields above are used for SCell dormancy indication, where each bit corresponds to one of the configured SCell(s), with MSB to LSB of the following fields concatenated in the following order corresponding to the SCell with lowest to highest SCell index: Modulation and coding scheme of transport block 1, New data indicator of transport block 1, Redundancy version of transport block 1, HARQ process number, Antenna port(s), DMRS sequence initialization.

In some embodiments, the bit number of PDCCH search space set group switch indicator in field is determined by a high layer signaling. In some embodiments, each bit of PDCCH search space set group switch indicator can be associated with a serving cell group. In such embodiments, the bit is used to indicate PDCCH search space set group switch in the associated serving cell group. In some embodiments, the PDCCH search space set group switch indicator only has one bit. In such embodiments, this bit is used to indicate PDCCH search space set group switch in the serving cell or that BWP received the indication.

Examples

In some embodiments, if a condition satisfied, fields which can be used for SCell dormancy indicator is also used to indicate PDCCH search space set group switch. In some embodiments, condition is at least one of the following: DCI-based search space set group switch is enabled, higher layer parameter Scell-groups-for-dormancy-within-active-time is configured, one-shot HARQ-ACK request is not present or set to '0', and all bits of frequency domain resource assignment are set to 0 for resource allocation type 0 or set to 1 for resource allocation type 1 or set to 0 or 1 for dynamic switch resource allocation type. In some embodiments, if one-shot HARQ-ACK request is not present or set to '0', and all bits of frequency domain resource assignment are set to 0 for resource allocation type 0 or set to 1 for resource allocation type 1 or set to 0 or 1 for dynamic switch resource allocation type, the following fields: Modulation and coding scheme field, New data indicator field, Redundancy version field, HARQ process number field, Antenna port(s) field, and DMRS sequence initialization field are used for SCell dormancy indication and PDCCH search space set group switch indication, where each bit of SCell dormancy indication corresponds to one of the configured SCell(s) and each bit of PDCCH search space set group switch indication corresponds to a serving cell group or a serving cell, with MSB to LSB of the following fields above concatenated in the order below corresponding to the SCell with lowest to highest SCell index and PDCCH search space set group switch indication. In some embodiments, if one-shot HARQ-ACK request is not present or set to '0', and all bits of frequency domain resource assignment are set to 0 for resource allocation type 0 or set to 1 for resource allocation type 1 or set to 0 or 1 for dynamic switch resource allocation type, the following fields: Modulation and coding scheme field, New data indicator field, Redundancy version field, HARQ process number field, Antenna port(s) field, and DMRS sequence initialization field are used for SCell dormancy indication and PDCCH search space set group switch indication, where each bit of SCell dormancy indication corresponds to one of the configured SCell(s) and each bit of PDCCH search space set group switch indication corresponds to a serving cell group or a serving cell, with MSB to LSB of the fields above concatenated in the order.

Figure 5:
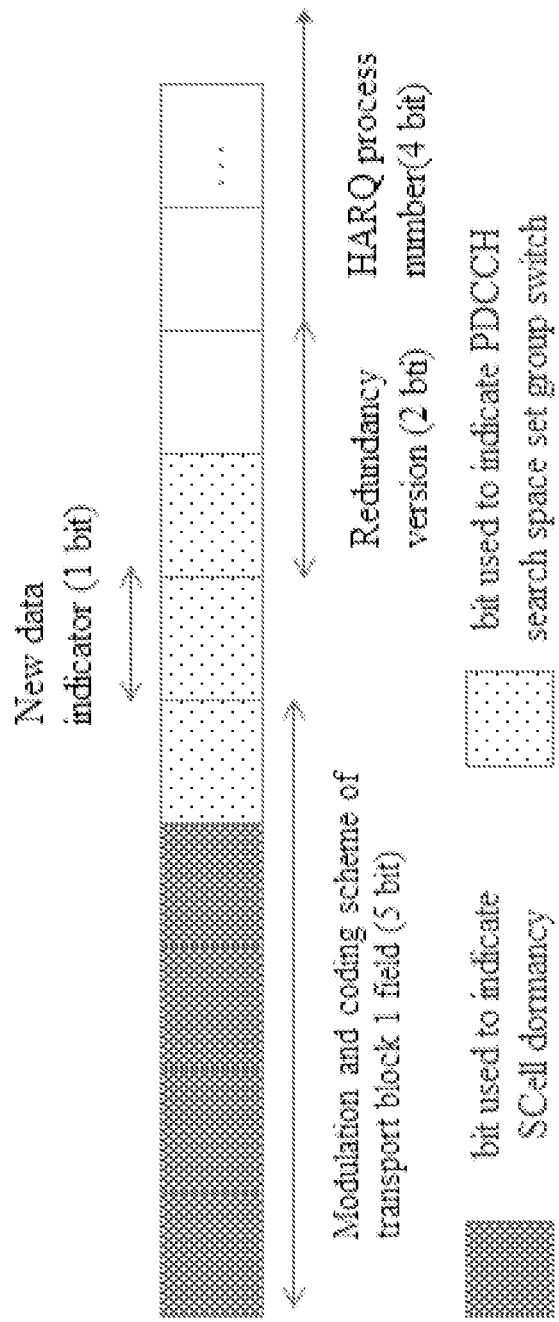
FIG. 5 shows an example placement of search space set group switch indication in a secondary Cell (SCell) dormancy indication field.

FIG. 5 shows an example placement of search space set group switch indication in a secondary Cell (SCell) dormancy indication field. In some embodiments, the indication of PDCCH search space set group switch is placed behind SCell dormancy indication. In FIG. 5, SCell dormancy indicator is placed in the first 4 bits and PDCCH search space set group switch indication is placed right behind SCell dormancy indicator. In some embodiments, the bits represent the following parameters from left to right: Modulation and coding scheme of transport block 1, New data indicator of transport block 1, Redundancy version of transport block 1, HARQ process number, Antenna port(s), DMRS sequence initialization.

In some embodiments, if SCell dormancy indication is not enabled and DCI based PDCCH search space set group switch is enabled, the scell dormancy indication field is present and only used to indicate PDCCH search space set group switch. In some embodiments, SCell dormancy indication is not enabled means the SCell dormancy indication field is not present because the high layer signaling is not configured based on an information associated with SCell dormancy. The benefit of this technique includes: because the SCell dormancy indicator has a HARQ-ACK, gNB can know whether the UE received the indication.

In some embodiments, the SCell dormancy indicator field is reused or repurposed to indicate PDCCH search space set group switch. In some embodiments, if SCell dormancy indicator field is not present because SCell dormancy indicator field is not enabled, and DCI based PDCCH search space set switch is enabled, the SCell dormancy indicator field is present and used only to indicate PDCCH search space set group switch.

Add a New Field

In some embodiments, PDCCH search space set group switch is indicated in a new field in a DCI. The bit-width of the new field is determined by high layer signaling.

Predefined Signaling

In some embodiments, predefined signaling is a L1(layer 1) signaling. In some embodiments, predefined signaling is a high layer signaling. In some embodiments, predefined signaling is a DCI signal. In some embodiments, the DCI signal format is at least one of formats: DCI format 0_1 or DCI format 1_1 or DCI format 2_0 or DCI format 2_6. In some embodiments, if UE receives different indications of PDCCH search space set group switch from different DCI simultaneously, UE behavior will be based on at least one of the following: according to the indication carried by DCI format 1_1; according to the indication carried by DCI format 2_0; According to the indication carried by DCI format 0_1; according to the indication carried by a DCI format with higher priority; according to the indication with lowest index; ignore all indication.

In some embodiments, priority of DCI format is indicated by high layer signaling or DCI. In some embodiments, priority of DCI format is in the following order: DCI format 1 DCI format 0_1≥DCI format 2_0. In some embodiment, priority of DCI format is in the following order: DCI format 2_0≥DCI format 1_1≥DCI format 0_1. In some embodiments, DCI format 2_6 has highest priority. In some embodiments, UE does not expect receive a different indication of PDCCH search space set group switch from different DCI simultaneously. For example, in some embodiments, UE may receive one DCI indicating a search space set group index 0 and another DCI indicating a search space set group index 1. In such embodiments, if UE does not expect to receive a different indication of PDCCH search space set group switch from different DCI simultaneously, UE may determine both DCI indications are error indications and ignore both the indications.

In some embodiments, simultaneously means in one slot or in one symbol or in one millisecond.

In some embodiments, predefined signaling indicates PDCCH search space set group switch in the active BWP or serving cell which received the indication. For example, predefined signaling includes at least DCI format 0_1 or DCI format 1_1, and the DCI indicates PDCCH search space set group switch in the active BWP or serving cell that received the DCI.

In some embodiments, predefined signaling indicates PDCCH search space set group switch in more than one serving cell or in a serving cell group or in more than one BWP. In some embodiments, predefined signaling includes DCI format 1_1. In such embodiments, the DCI indicates PDCCH search space set group switch in serving cell group. In such embodiments, the serving cell group is configured by high layer signaling. In some embodiments, predefined signaling includes DCI format 2_6. In such embodiments, the DCI indicates PDCCH search space set group switch information to one or more UEs.

In some embodiments, predefined signaling cannot include both DCI format 2_0 and a second kind DCI format. In such embodiments, the second kind DCI format is at least one of: DCI format 0_1, DCI format 1_1, DCI format 2_6. In some embodiments, if UE receives indication of PDCCH search space set group switch in DCI format 2_0 and a second kind DCI format, the second kind DCI format is at least DCI format 1_1 or DCI format 0_1. In such embodiments, the UE may follow the indication in second kind DCI format for the associate BWP or serving cell, and for the serving cell. In some embodiments, if BWP does not indicate a PDCCH search space set group switch information in second kind DCI but has an indication of PDCCH search space set group switch in DCI format 2_0, UE may follow the indication of DCI format 2_0.

In some embodiments, PDCCH search space set group switch triggered by DCI format 0_1 or DCI format 1_1 or DCI format 2_6 is disabled in unlicensed band. In some embodiments, PDCCH search space set group switch triggered by DCI format 2_0 is disabled in licensed band.

Apply Duration

In some embodiments, operating, by the mobile station according to the monitoring mode after an apply duration means gNB switch to a search space set group indicated by a predefined signaling or a timer after an apply duration. In some embodiments, switch to means finish switching. In some embodiments, the apply duration of PDCCH search space set group switch may associate with at least one of the following: application delay of minimum scheduling offset, high layer signaling, BWP switch delay, sub-carrier space (SCS), predefined value, minimum scheduling offset of K0(K0min), minimum scheduling offset of K2(K2 min), K0, K2, K1, a UE capability, UE type, UE assistance information. In some embodiments, apply duration is in units of symbols or slots or milliseconds. In some embodiments, apply duration starts from the symbol after the last symbol of PDCCH which indicates a PDCCH search space set group switch. In some embodiments, apply duration starts from next slot after the slot which indicates a PDCCH search space set group switch. In some embodiments, a PDCCH search space set group switch is indicated by receiving (or indicating) a PDCCH search space set group index. In other embodiments, a PDCCH search space set group switch is indicated by receiving (or indicating) a PDCCH search space set group index different from current applied PDCCH search space set group.

In some embodiments, apply duration of PDCCH search space set group switch may associate with at least one of application delay of minimum scheduling offset and a high layer signaling. In some embodiments, if a first predefined condition is satisfied, apply duration of PDCCH search space set group switch may associate with at least application delay of minimum scheduling offset, otherwise, apply duration of PDCCH search space set group switch may not associate with application delay of minimum scheduling offset. In some embodiments, first predefined condition is at least one of the following: minimum applicable scheduling offset indication field is used to indicate PDCCH search space set group switch, A minimum scheduling offset of K0(K0min) or a minimum scheduling offset of K2(K2 min) is applied.

In some embodiments, high layer signaling is configured with an initial apply duration (T_duration_i) of PDCCH search space set group switch, the initial apply duration may be further determined based on application delay of minimum scheduling offset (T_app_min). In some embodiments, high layer signaling is configured with an initial apply duration (T_duration_i) of PDCCH search space set group switch for different SCS, the value associated is a SCS, which is the same as the BWP receive the indication is used, the initial apply duration may be further determined based on by application delay of minimum scheduling offset (T_app_min). in some embodiments, the initial apply duration may be further determined based on by application delay of minimum scheduling offset (T_app_min) if first predefined condition is satisfied.

For example, T_duration_i=operation1(T_duration_i, T_app_min), operation1 may be maximum or minimum or addition. In some embodiments, T_duration_i and T_app_min may have different units (e.g., T_duration_i is units in symbols and T_app_min is units in slots), they need to change to same units before final determination (the operation1). For example, T_duration_i is units in symbols and T_app_min is units in slots, unit of T_duration_i may be changed to unit of T_app_min according to operation2 (T_duration_i/Nslot), operation2 may be round up or round down or retain the original value. Nslot is the number of symbols in one slot. For another example, T_duration_i is units in symbols and T_app_min is units in slots, unit of T_app_min change to unit of T_duration_i according to T_app_min*Nslot.

In some embodiments, apply duration of PDCCH search space set group switch may associate with at least application delay of minimum scheduling offset and a predefined value. In some embodiments, predefined value includes an initial apply duration (T_duration_i) of PDCCH search space set group switch, the initial apply duration may be further determined based on application delay of minimum scheduling offset (T_app_min). In some embodiments, predefined value includes an initial apply duration (T_duration_i) of PDCCH search space set group switch, the initial apply duration may be further determined based on application delay of minimum scheduling offset (T_app_min) if first predefined condition satisfied. In some embodiments, predefined value includes an initial apply duration (T_duration_i) of PDCCH search space set group switch for different SCS, the value associates with a SCS is the same as the BWP receive the indication is used, the initial apply duration may be further determined based on application delay of minimum scheduling offset(T_app_min).

For example, T_duration_i=operation1(T_duration_i, T_app_min), operation1 may be maximum or minimum or addition. In some embodiments, T_duration_i and T_app_min may have different units (e.g., T_duration_i is units in symbols and T_app_min is units in slots), they need to change to same units before final determination (operation1). For example, T_duration_i is units in symbols and T_app_min is units in slots, unit of T_duration_i change to unit of T_app_min according to operation2(T_duration_i/Nslot), operation2 may be round up or round down or retain the original value. Nslot is the number of symbols in one slot. For another example, T_duration_i is units in symbols and T_app_min is units in slots, unit of T_app_min change to unit of T_duration_i according to T_app_min*Nslot.

In some embodiments, if K0min or K2 min is applied, apply duration of PDCCH search space set group switch may associate with at least one of a predefined value, K0min, K2 min. For example, predefined value includes an initial apply duration (T_duration_i) of PDCCH search space set group switch. In some embodiments, if a K0min or K2 min is applied, the initial apply duration may be further determined according to at least current applied K0min. In some embodiments, if a K0min or K2 min is not applied, the initial apply duration is the final apply duration. In some embodiments, apply duration of PDCCH search space set group switch may associate with at least high layer signaling, a predefined value, K0min, K2 min.

For example, high layer signaling configures an initial apply duration (T_duration_i) of PDCCH search space set group switch. In some examples, if a K0min or K2 min is applied, the initial apply duration may be further determined according to a predefined value and current applied K0min. In other examples, if a K0min or K2 min is not applied, the initial apply duration is the final apply duration. In some examples, initial apply duration may be modified according to a predefined value and current applied K0min according to operation (T_duration_i, X), operation may be minimum or maximum or addition.

$$X = \max\left(\left\lceil K_{0minOld} \cdot \frac{2^{\mu_{PDCCH}}}{2^{\mu_{PDSCH}}} \right\rceil, Z_\mu \right)$$

where $K_{0minOld}$ is the currently applied $K_{0min}$ value of the active DL BWP in the scheduled cell and is zero, if minimumSchedulingOffsetK0 is not configured for the active DL BWP in the scheduled cell, is predefined value and determined by the subcarrier spacing of the active DL BWP in the scheduling cell in slot receive the indication, and given in Table 1, and $\mu_{PDCCH}$ and $\mu_{PDSCH}$ are the sub-carrier spacing configurations for PDCCH of the active DL BWP in the scheduling cell and PDSCH of the active DL BWP in the scheduled cell, respectively, in slot receive the indication. X is based on SCS of scheduling cell in slot receive the indication.

When the indication is received outside the first three symbols of the slot, value of 4 from Table 1 is incremented by one before determining the X

TABLE 1

Definition of $Z_\mu$

| μ | $Z_\mu$ |
|---|---|
| 0 | 1 |
| 1 | 1 |
| 2 | 2 |
| 3 | 2 |

In some embodiments, apply duration of PDCCH search space set group switch may associate with at least high layer signaling, SCS, UE capability, application delay of minimum scheduling offset. For example, high layer signaling may configure an apply duration of PDCCH search space set group switch according to SCS and UE capability. TABLE 2 illustrates this as an example.

TABLE 2

Minimum value of apply duration of PDCCH search space set group switch [symbols]

| μ | Minimum value for UE processing capability 1 [symbols] | Minimum value for UE processing capability 2 [symbols] |
|---|---|---|
| 0 | 25 | 10 |
| 1 | 25 | 12 |
| 2 | 25 | 22 |

High layer signal cannot configure an initial apply duration (T_duration_i) value smaller than the minimum value in the Table 2. T_duration_i may then be modified (or determined) by application delay (T_app_min) of minimum scheduling offset. For example, T_duration_i=operation (T_duration_i, T_app_min), operation may be maximum or minimum or addition.

In some embodiments, apply duration of PDCCH search space set group switch may associate with at least high layer signaling, BWP switch delay.

In some embodiments, if second predefined condition is satisfied, apply duration of PDCCH search space set group switch may associate with at least BWP switch delay, otherwise, apply duration of PDCCH search space set group switch may not associate with BWP switch delay. In some embodiments, the second predefined condition is at least one of the following: BWP switch and fields used for SCell dormancy indication is also used for PDCCH search space set group switch.

For example, a high layer signaling configures an apply duration (T_duration_i) of PDCCH search space set group switch for each SCS. In some embodiments, if the DCI carries indication of PDCCH search space set group switch also indicate a BWP switch in the BWP or serving cell, the T_duration_i may be further determined based on BWP switch delay (T_bwp). For example, T_duration_i=operation (T_duration_i, T_bwp), operation is maximum or minimum or addition. In some embodiments, if the DCI carries indication of PDCCH search space set group switch does not indicate a BWP switch, the T_duration_i does not need further determination.

In some embodiments, if units of T_duration_i and T_bwp is different, they need align the units before further determination (operation). In some embodiments, indicating a BWP switch includes a BWP indicator indicating different BWP index from current active BWP and a SCell dormancy indicator indicating a BWP different from current active BWP.

In some embodiments, the apply duration of PDCCH search space set group switch may associate with at least K0 or K2. For example, the apply duration is not smaller than the K0 or K2 indicated by the DCI which indicates a PDCCH search space set group switch. In other words, the indicated PDCCH search space set group switch applied after receiving the scheduled PDSCH or PUSCH.

In some embodiments, the apply duration of PDCCH search space set group switch may associate with at least K0 and K1. For example, the apply duration is not smaller than the K1 indicated by the DCI which indicates a PDCCH search space set group switch. In other words, the indicated PDCCH search space set group switch is applied after transmission of ACK/NACK.

K1: slot between physical downlink shared channel and a hybrid automatic repeat request acknowledgement As stated above, in some embodiments, apply duration of PDCCH search space set group switch need to be further determined according to at least one of the following: application delay of minimum scheduling offset, K0min, BWP switch delay. In some embodiments, if the units of apply duration of PDCCH search space set group switch is different from the initial value, they need align the units before further processing (or determination). In other embodiments, if the unit of apply duration is changed before further determination, it needs to be changed back after further determination. As stated above, in some embodiments, apply duration of PDCCH search space set group switch may be different in different conditions. In some embodiments, condition includes at least one of the following: UE capability, SCS, whether BWP switch, whether a K0min or K2 min applied. For example, apply duration of PDCCH search space set group switch may need to be further determined if third condition satisfied. third condition include at least one of the following: a K0min or K2 min is applied, a BWP switch.

In some embodiments, apply duration of PDCCH search space set group switch may be different for different triggering methods. For example, apply duration of PDCCH search space set group switch for timer based PDCCH search space set group switch is different from the apply duration of PDCCH search space set group switch for DCI based PDCCH search space set group switch.

In some embodiments, if PDCCH search space set group switch indication is using minimum scheduling offset indication field, the application delay of minimum scheduling offset indication (T_min) is determined according to the original application delay of minimum scheduling offset indication (T_app_min) and apply duration of PDCCH search space set group switch (T_duration). For example, T_min=operation (T_app_min, T_duration). In some embodiments, the operation is minimum or maximum or addition. In some embodiments, the units of T_app_min and T_duration need to be aligned first. In some embodiments, the T_min unit is slots. In some embodiments, during the apply duration, UE does not expect to receive another PDCCH search space set group indication. In some embodiments, during the apply duration, UE does not expect to receive another PDCCH search space set group indication for the BWP or serving cell.

Figure 6:
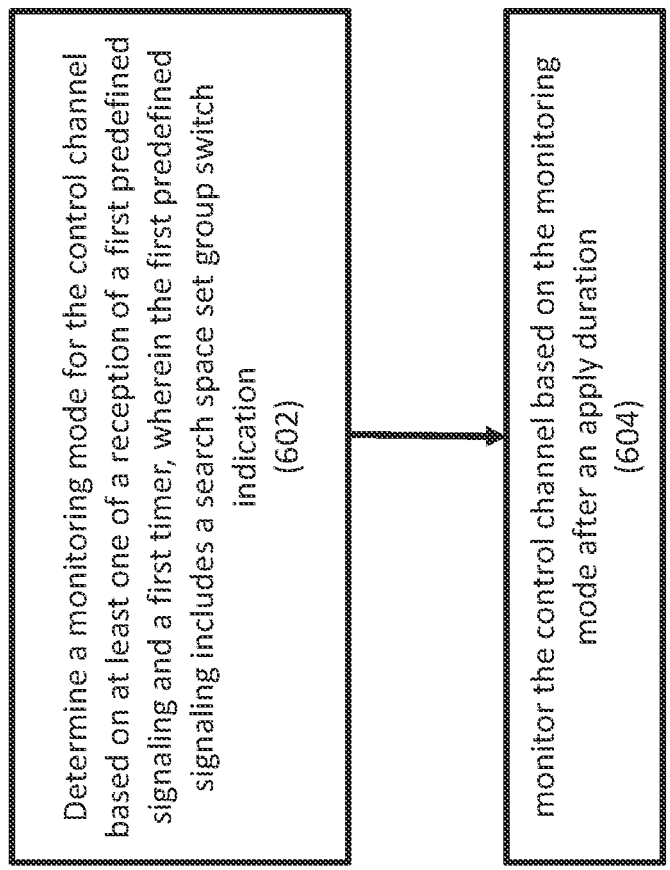
FIG. 6 shows an exemplary flowchart for a wireless communication method for a communication device according to various embodiments.
Figure 7:
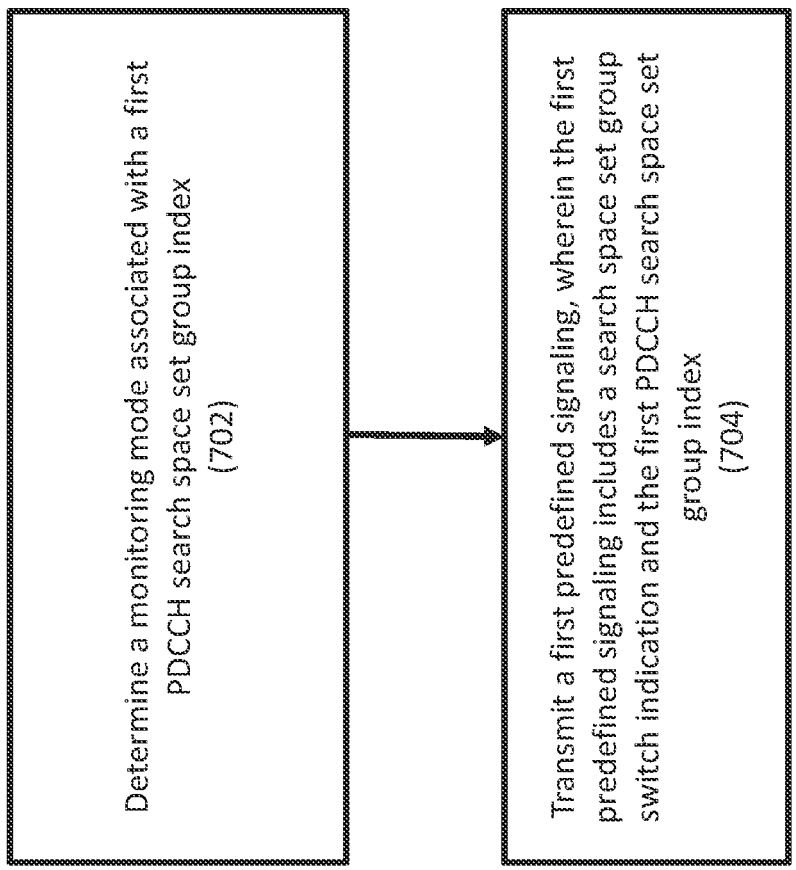
FIG. 7 shows an exemplary flowchart for a wireless communication method for a network device according to various embodiments.

FIG. 6 shows an exemplary flowchart for a wireless communication method for a communication device according to various embodiments. In various embodiments, as explained above, the communication device 112 (e.g., UE 112) can determine a monitoring mode for the control channel based on at least one of a reception of a first predefined signaling and a first timer, wherein the first predefined signaling includes a search space set group switch indication at step 602. At step 604, the communication device 112 monitors the control channel based on the monitoring mode after an apply duration. FIG. 7 shows an exemplary flowchart for a wireless communication method for a network device according to various embodiments. In various embodiments, as explained above, the mobile station 120 can determine a monitoring mode associated with a first PDCCH search space set group index at step 702. At step 704, the mobile station 120 transmits a first predefined signaling to a UE, wherein the first predefined signaling includes a search space set group switch indication and the first PDCCH search space set group index.

Figure 8:
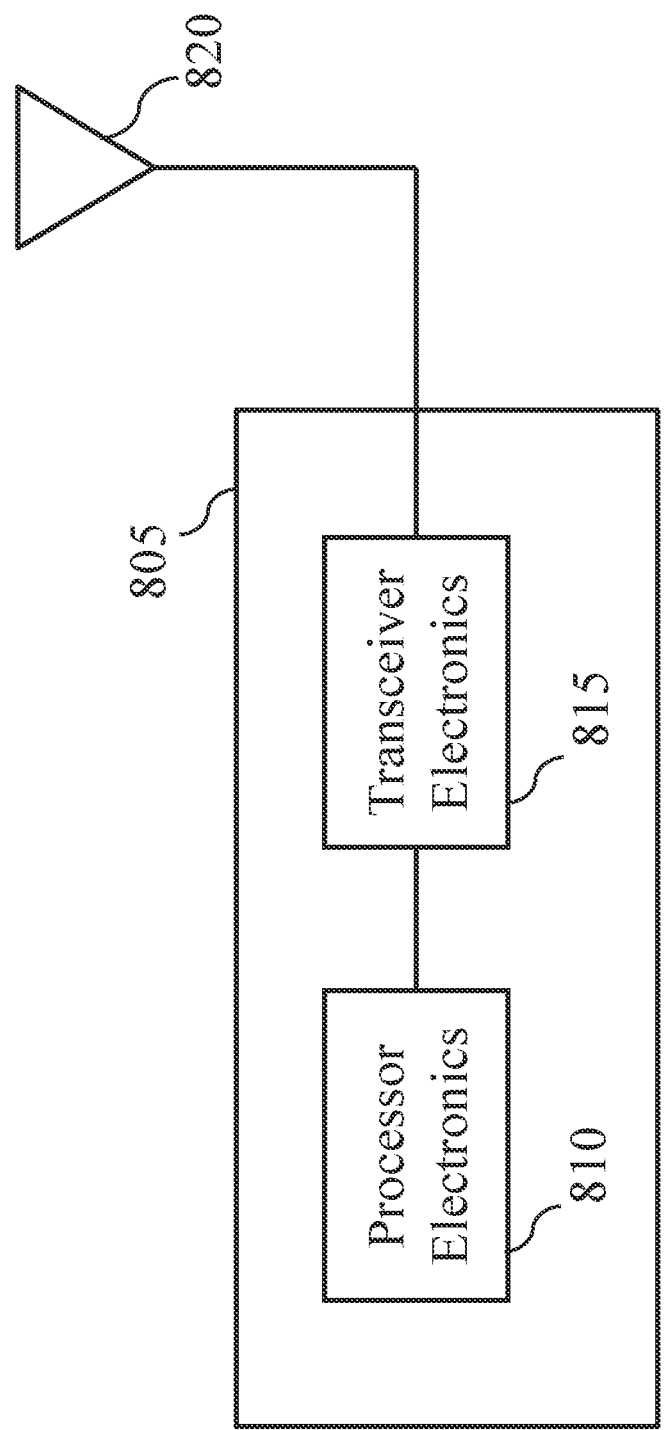
FIG. 8 is a block diagram representation of a portion of an apparatus that can be used to implement methods and/or techniques of the presently disclosed technology.

FIG. 8 is a block diagram representation of a portion of an apparatus, in accordance with some embodiments of the presently disclosed technology. An apparatus 805, such as a base station or a wireless device (or UE), can include processor electronics 810 such as a microprocessor that implements one or more of the techniques presented in this document. The apparatus 805 can include transceiver electronics 815 to send and/or receive wireless signals over one or more communication interfaces such as antenna(s) 820. The apparatus 805 can include other communication interfaces for transmitting and receiving data. Apparatus 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the apparatus 805.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
   determining, by a communication device, a monitoring mode for a control channel based on at least one of a reception of a first predefined signaling or a first timer, wherein the first predefined signaling is a Downlink Control Information (DCI) that includes a search space set group switch indication that is indicated in at least a portion of a DCI message field repurposed from another purpose, wherein the DCI message field is a minimum applicable scheduling offset indicator field for which the another purpose is to indicate a minimum scheduling offset restriction, and
   monitoring, by the communication device the control channel based on the monitoring mode after an apply duration that is a first duration in case of the monitoring mode being determined based on the reception of the first predefined signaling and a second duration in case of the monitoring mode being determined based on the first timer.

2. The method of claim 1, wherein the determination of the monitoring mode
   based on the reception of the first predefined signaling further comprises:

enabling the determination of the monitoring mode based on the reception of the first predefined signaling.

3. The method of claim 1, wherein the determination of the monitoring mode by the reception of the first predefined signaling is made based on one or more information fields in the first predefined signaling.

4. The method of claim 1, wherein the search space set group switch indication includes at least one of: a search space set group index, an enable search space set group indicator, or a search space set switch parameter.

5. The method of claim 4, wherein the search space set switch parameter includes one or more of: a scaling factor of PDCCH monitoring periodicity, a threshold of PDCCH monitoring periodicity, a PDCCH monitoring offset, a threshold of monitoring duration, a PDCCH monitoring periodicity, a monitoring duration, a scaling factor of monitoring duration and a PDCCH monitoring pattern within a slot.

6. The method of claim 1, wherein the search space set group switch indication is only applicable to active BWP or serving cell which received the search space set group switch indication.

7. The method of claim 1, wherein the search space set group switch indication is indicated in one or more of:
the minimum applicable scheduling offset indication field,
a search space set group switch indication field,
a secondary Cell (SCell) dormancy indication field,
Modulation and coding scheme field,
New data indicator field,
Redundancy version field,
HARQ process number field,
Antenna port(s) field, or
DMRS sequence initialization field.

8. The method of claim 7, wherein the search space set group switch indication is indicated in the secondary Cell (SCell) dormancy indication field only if a condition is satisfied, wherein satisfying the condition includes satisfying at least one of:
DCI-based search space set group switch is enabled;
higher layer parameter Scell-groups-for-dormancy-within-active-time is configured,
one-shot HARQ-ACK request is not present or set to '0', or
all bits of frequency domain resource assignment are set to 0 for resource allocation type 0 or set to 1 for resource allocation type 1 or set to 0 or 1 for dynamic switch resource allocation type.

9. The method of claim 8, wherein if the condition is satisfied and the search space set group switch indication is indicated in the secondary Cell (SCell) dormancy indication field, the secondary Cell (SCell) dormancy indication field includes one or more bits of the search space set group switch indication concatenated with one or more bits of the SCell dormancy indication.

10. The method of claim 1, wherein the apply duration is determined based on one or more of:
application delay of minimum scheduling offset,
high layer signaling,
BWP switch delay,
sub-carrier space (SCS),
a predefined value,
minimum scheduling offset of K0 (K0min),
minimum scheduling offset of K2 (K2min),
K0,
K2,
K1,
UE capability,
UE type, or
UE assistance information.

11. The method of claim 1, wherein the control channel is a physical downlink control channel (PDCCH).

12. A wireless communication method comprising:
determining, by a wireless access node, a monitoring mode associated with a first PDCCH search space set group index; and
transmitting, by the wireless access node to a communication device, a first predefined signaling that is a Downlink Control Information (DCI), wherein the first predefined signaling includes a search space set group switch indication and a first PDCCH search space set group index for the communication device to operate according to the monitoring mode after an apply duration, wherein the apply duration is a first duration in case of the communication device determining the monitoring mode based on the first predefined signaling and a second duration in case of the communication device determining the monitoring mode based on a first timer, and wherein the search space set group switch indication is indicated in at least a portion of a DCI message field repurposed from another purpose, wherein the DCI message field is a minimum applicable scheduling offset indicator field for which the another purpose is to indicate a minimum scheduling offset restriction.

13. The method of claim 12, wherein the DCI message field repurposed from the another purpose comprises at least one of:
the minimum applicable scheduling offset indicator field,
a secondary Cell(SCell) dormancy indication field,
Modulation and coding scheme field,
New data indicator field,
Redundancy version field,
HARQ process number field,
Antenna port(s) field, or
DMRS sequence initialization field.

14. The method of claim 12, wherein the transmitting the first predefined signaling further comprises:
enabling the transmitting the first predefined signaling based on one or more of: a high layer signaling, a UE capability, the Downlink Control Information (DCI), a Radio Network Temporary Identifier (RNTI), a bandwidth part (BWP) and a band.

15. A wireless apparatus for wireless communication comprising processor electronics and a memory storing instructions that, when executed by the processor electronics, cause the wireless apparatus to:
determine a monitoring mode for a control channel based on at least one of a reception of a first predefined signaling or a first timer, wherein the first predefined signaling is a Downlink Control Information (DCI) that includes a search space set group switch indication that is indicated in at least a portion of a DCI message field repurposed from another purpose, wherein the DCI message field is a minimum applicable scheduling offset indicator field for which the another purpose is to indicate a minimum scheduling offset restriction, and
monitoring the control channel based on the monitoring mode after an apply duration that is a first duration in case of the monitoring mode being determined based on the reception of the first predefined signaling and a second duration in case of the monitoring mode being determined based on the first timer.

16. A network apparatus for wireless communication comprising processor electronics and a memory storing instructions that, when executed by the processor electronics, cause the network apparatus to:
- determine a monitoring mode associated with a first PDCCH search space set group index; and
- transmit, to a communication device, a first predefined signaling that is a Downlink Control Information (DCI), wherein the first predefined signaling includes a search space set group switch indication and the first PDCCH search space set group index for the communication device to operate according to the monitoring mode after an apply duration, wherein the apply duration is a first duration in case of the communication device determining the monitoring mode based on the first predefined signaling and a second duration in case of the communication device determining the monitoring mode based on a first timer, and wherein the search space set group switch indication is indicated in at least a portion of a DCI message field repurposed from another purpose, wherein the DCI message field is a minimum applicable scheduling offset indicator field for which the another purpose is to indicate a minimum scheduling offset restriction.

17. The method of claim 1, wherein the DCI message field is repurposed to indicate the search space set group switch indication based on search space set group switching being enabled.

* * * * *